United States Patent [19]

Goodfellow et al.

[11] Patent Number: 4,840,697

[45] Date of Patent: Jun. 20, 1989

[54] APPARATUS FOR HANDLING SHEET MATERIAL

[75] Inventors: Anthony G. Goodfellow, Maghull; Anthony R. Wright, Southport, both of England

[73] Assignee: W&A Bates Limited, United Kingdom

[21] Appl. No.: 103,665

[22] Filed: Oct. 2, 1987

Related U.S. Application Data

[62] Division of Ser. No. 697,243, Feb. 1, 1985, Pat. No. 4,714,505.

[30] Foreign Application Priority Data

Feb. 10, 1984 [GB] United Kingdom ............... 8403494

[51] Int. Cl.⁴ .............................................. B29D 30/30
[52] U.S. Cl. ................................. 156/405.1; 156/378; 156/417; 156/421.8; 198/395; 271/195; 271/227; 271/236; 271/253; 414/755
[58] Field of Search ............... 156/396, 405.1, 406.2, 156/417–420, 421.8, 110.1, 111, 123, 133, 134, 378, 379, 64, 361, 364; 198/394, 395; 406/87; 414/755, 752, 225, 627; 271/195, 227, 232, 235, 236, 253

[56] References Cited

U.S. PATENT DOCUMENTS 3,881,605  5/1975  Grossman ...................... 198/395 X
4,228,993 10/1980  Cathers ............................ 271/236
4,504,337  3/1985  Askam et al. .................. 156/133 X
4,547,251 10/1985  Lanosness ...................... 156/133 X

FOREIGN PATENT DOCUMENTS 104339  7/1983  European Pat. Off. .
0105335  6/1982  Japan ........................... 156/405.1
1106685  8/1984  U.S.S.R. ....................... 156/405.1
1070822  3/1965  United Kingdom .
1103293  6/1965  United Kingdom .
1355231  9/1971  United Kingdom .
2001037  7/1978  United Kingdom .
2108060  8/1982  United Kingdom .
2108442  9/1982  United Kingdom .
2117019  3/1983  United Kingdom .

Primary Examiner—David Simmons
Assistant Examiner—Thomas Bokan
Attorney, Agent, or Firm—Stevens, Davis, Miller & Mosher

[57] ABSTRACT

In the feeding of sheet material to a machine such as a tire building former a sheet is first placed on a table and one edge of the sheet is aligned with a first datum line, preferably by tilting the table and supplying floatation air under the sheet. The sheet is then picked up and moved transversely through a predetermined distance by a gripping device to align one edge with a second datum line so as to enable the sheet to be fed in appropriate alignment to a machine.

9 Claims, 4 Drawing Sheets

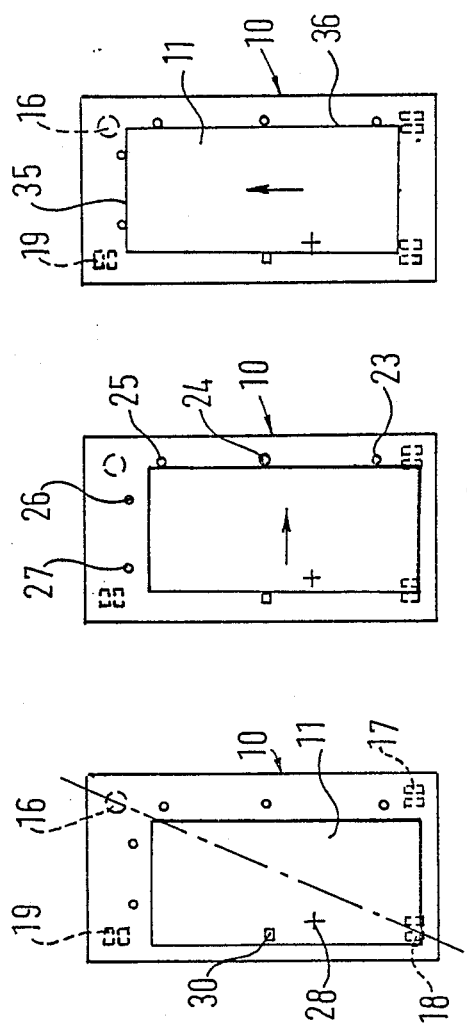
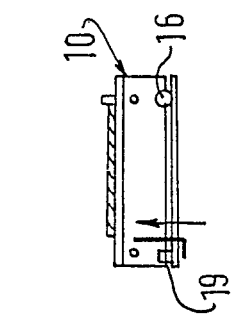
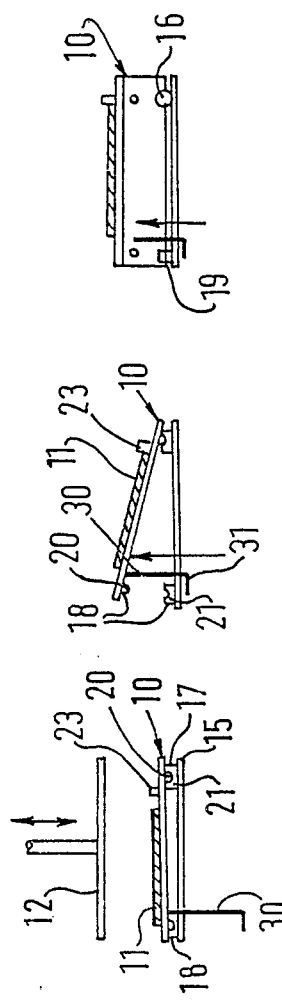

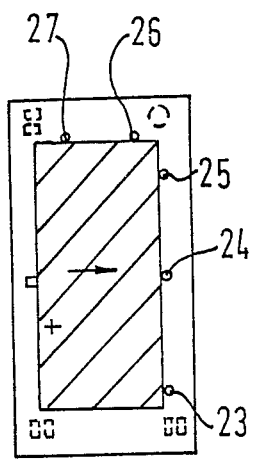
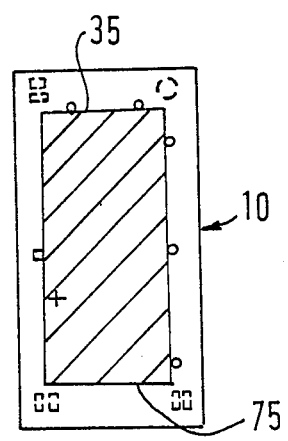
FIG.4  FIG.5
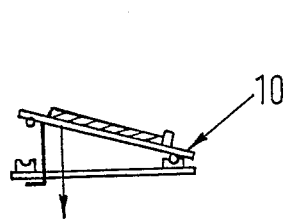
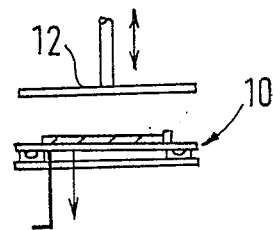
FIG.9  FIG 10

APPARATUS FOR HANDLING SHEET MATERIAL

This is a division of application Ser. No. 697,243, filed Feb. 1, 1985, now U.S. Pat. No. 4,714,505.

This invention relates to methods and apparatus for handling sheet material, particularly but not exclusively for use in the manufacture of pneumatic tires.

In the manufacture of pneumatic tires it is necessary to wrap sheets of material such as plies of rubberized parallel-cord fabric around a tire building former, and in order to obtain a uniform tire structure it is essential to feed the plies along an accurately predetermined path in presenting them to the former. It is also important that the length of each ply and the circumference of the former are accurately matched so as to achieve a good joining relationship of the ends of the ply after it has been wrapped around the former. These requirements are particularly difficult to satisfy in the practice of automatic methods of tire building.

One object of the present invention is to provide a method of feeding a sheet of ply material to a tire building former in which the alignment of the ply is accurately determined, and a second object is to match accurately the length of the ply and the circumferential dimension of the former and any material already on the former.

According to one aspect of the invention, a method of feeding a sheet of material to a machine comprises laying the sheet on a table, arranging the sheet on the table to align an edge of the sheet with a first datum line, applying a gripping device to the sheet and moving the gripping device and the sheet in an alignment-preserving manner automatically to align the said edge with a second datum line bearing a predetermined relationship to the first datum line and suitably positioned in relation to the said machine to enable the sheet to be fed in appropriate alignment to the machine.

In a preferred method in accordance with the invention the sheet of material is a ply of tire building fabric and the machine is a tire building former. The alignment of a side edge of the ply with a first datum line on the table is preferably carried out, according to a further feature of the invention, by transversely tilting the table while providing a flow of air beneath the ply to permit it to float over the table surface into appropriate alignment, against a raised side abutment. Additionally, an end abutment may be provided, the associated ply end being moved into contact with the end abutment by longitudinally tilting the table while providing a flow of floatation air beneath the ply.

Following the accurate placing of a ply on a table, the ply may be moved transversely, for example by a vacuum gripping device, and positioned on a conveyor so that its position and alignment on the conveyor bears a fixed relationship to the position and alignment which has been established on the table. This position and alignment is arranged so that the conveyor may then be operated to feed the ply in accurate position and alignment to a tire building former suitably located adjacent the conveyor.

In order to match the length of the ply and the circumference of the former so as to achieve a good joining relationship of the ends of the ply after it has been wrapped around the former, means may be provided to measure accurately the length of each ply and to adjust the diameter of the former if required.

The invention also provides apparatus for carrying out the method in accordance with the invention, comprising a table, means for tilting the table and for supplying floatation air to its surface so as to enable a sheet of material on the table to be aligned with the edge of the sheet in alignment with a first datum line, and a gripping device for the sheet arranged to be movable in an alignment-preserving manner automatically to align the said edge with a second datum line bearing a predetermined relationship to the first datum line so as to enable the sheet to be fed in appropriate alignment to a machine.

In a preferred apparatus in accordance with the invention the machine is a tire building former.

One embodiment of the invention will now be described, by way of example, with reference to the accompanying drawings in which:

FIGS. 1 to 5 are diagrammatic plan views showing a ply alignment table carrying a ply in successive stages of alignment;

FIGS. 6 to 10 are diagrammatic end views of the ply alignment table corresponding respectively to FIGS. 1 to 5;

Figure 11:
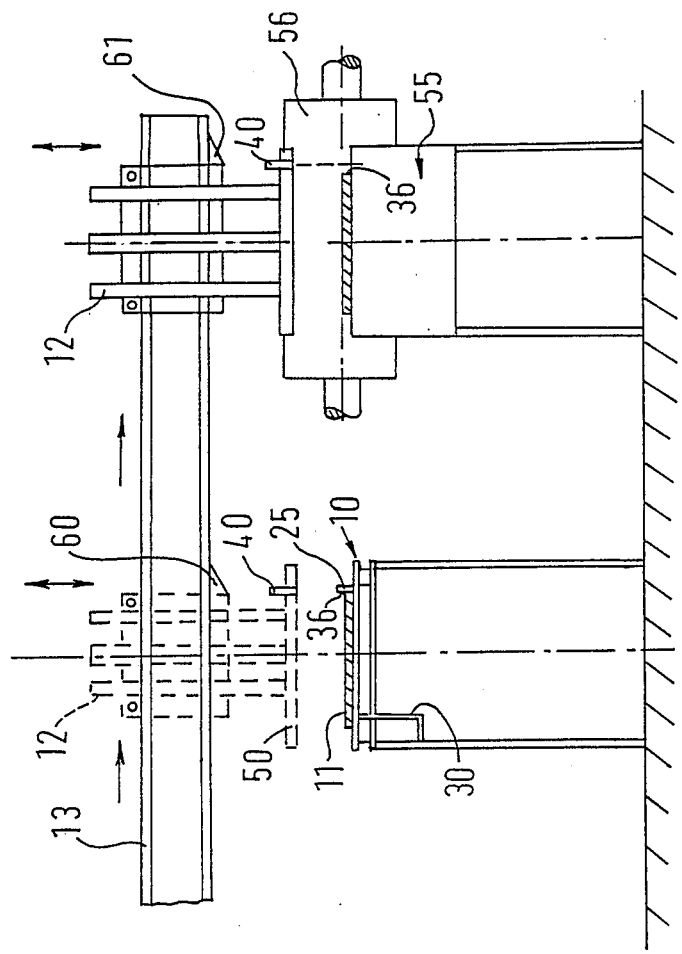
FIG. 11 is a diagrammatic end view showing the ply alignment table of FIGS. 1 to 10 in association with a tire building former and conveyor.

In the manufacture of a radial-ply pneumatic tire the carcass of the tire includes a ply of parallel-cord rubberized fabric in which the cords are arranged to run parallel to the axis of a tire building former. In the operation of building a tire in accordance with the method described in U.K. Published Application No. 2,129,380A, dated May 16, 1984 a pair of tire bead elements are located coaxially at opposite ends of a bead tube in axially spaced relationship and an expansible former around which tire carcass material is wrapped is located coaxially within the tube in a predetermined position so that the tire carcass material projects axially beyond the bead elements at each end of the former, the former then being expanded to cause the carcass to contact the bead elements and to turn the projecting ends of the material radially outwardly around the bead elements.

In order to carry out this process it is necessary for a ply of carcass material and an inner lining of rubber to be wrapped around the expansible former in a predetermined axial position on the former and with the cords of the ply in axial alignment. It is also necessary, particularly when the operation is carried out by automatic means, that when the ply is wrapped around the former its ends meet in a relationship which is nearly exactly abutting.

In order to achieve the accurately predetermined location of the ply in the axial sense relative to the former, a method as illustrated in the accompanying drawings is operated as follows:

FIG. 1 and FIG. 6 show a floatation table 10 in a state where a ply 11 has been placed in position on the table by a vacuum-operated gripping device 12 which is movable along an overhead track 13 (see FIG. 11) to transfer the ply from a temporary storage tray (not shown) to the floatation table. The cords of the ply are roughly aligned parallel with the shorter sides of the table 10.

The floatation table 10 is mounted on a sub-frame 15 by means of a ball joint 16 at one corner and by open location socket hinge joints 17,18,19 at the remaining three corners. The joints 17 to 19 each comprise a semi-cylindrical member 20 (see FIG. 6) secured to the table, which engages a corresponding socket 21 secured to the sub-frame 15 to permit tilting of the table about the axis of the member 20 while permitting the component parts of the joint to separate when required, e.g. as shown in FIG. 7 where the joint 18 is illustrated in the separated position.

The arrangement of the table 10 is such that it may be tilted about a longitudinal axis through the joints 16 and 17 so as to move the ply 11 transversely to the right as shown in FIGS. 1 and 2, and it may also be tilted about a transverse axis through the joints 16 and 19 to move the ply longitudinally as shown in FIG. 3. The table 10 is provided with a porous upper surface communicating with suitable ducts below the surface through which compressed air may be supplied to provide floatation of the ply, enabling it to move easily over the table surface in whichever direction the table is tilted.

A datum line defined by spring-loaded pegs 23,24,25 is provided on the table to constitute a first datum line for the ply, and similar pegs 26,27 provide an abutment for positioning the forward edge of the ply. Alignment of one edge of the ply with the first datum line is achieved as shown in FIGS. 2 and 7 by tilting the table and supplying air floatation to the underside of the ply. The tilting of the table is achieved by a pneumatic ram engaging the underside of the table at a lift point 28 which is offset from the centre of the table so as to produce initially a tilt about an axis through the joints 16,17, and an intermediate stop in the form of a stirrup 30 attached to the table at its upper end is positioned so that when the lower end 31 of the stirrup engages a suitable abutment (not shown) beneath the table, as seen in FIG. 7, the axis of tilt of the table is transferred to a line through joints 16,19. The relationship between the point 28 at which the lifting ram applies its thrust and the position of the intermediate stop 30 is such as to cause the table to tile first about a diagonal axis through the joints 16,18, until the joint 19 is reengaged and then to continue tilting about the transverse axis through the joints 16 and 19 as shown in FIG. 8.

After the tilting action illustrated in FIG. 8 has been completed, the forward end edge 35 of the ply 11 will have moved into engagement with the pegs 26,27, thus locating the ply in a predetermined position both with respect to its side edge 36 and its forward end edge 35. In this position, the air floatation of the ply is terminated so that the ply settles into a resting position on the table, as illustrated in FIGS. 9 and 10. The table is then lowered slowly until it is horizontally disposed, thus preserving the accurate location of the ply.

As shown in dotted lines in FIG. 11 the gripping device 12 is located in a predetermined position above the table 10 and carries photo-electric cells 40–43. The photo-electric cells 40–43 are connected in an electrical control system, providing data which confirms that the position of the ply as shown in FIGS. 4 and 5 is in fact in the correct predetermined location and alignment. The gripping device may then be operated so as to pick up the ply by means of a vacuum suction device (not illustrated) and hold the ply in a flat condition against the underside of a flat shoe 50 of similar area to the table 10.

The gripping device 12 is then moved to the full-line position shown in FIG. 11 above a conveyor 55, holding the edge 36 of the ply in alignment with a second datum line (not shown), parallel to the first datum line, which is arranged to have an accurately predetermined relationship with a tire building former 56. Adjustable stops 60,61 are provided to enable the relationship of the positions of the gripping device 12 adjacent the table 10 and the building former 56 respectively to be accurately predetermined, thus determining the position of the second datum line in relationship to the building former. The gripping device 12 is then operated to deposit the ply 11 on the conveyor 55 without disturbing its location and alignment.

Figure 12:
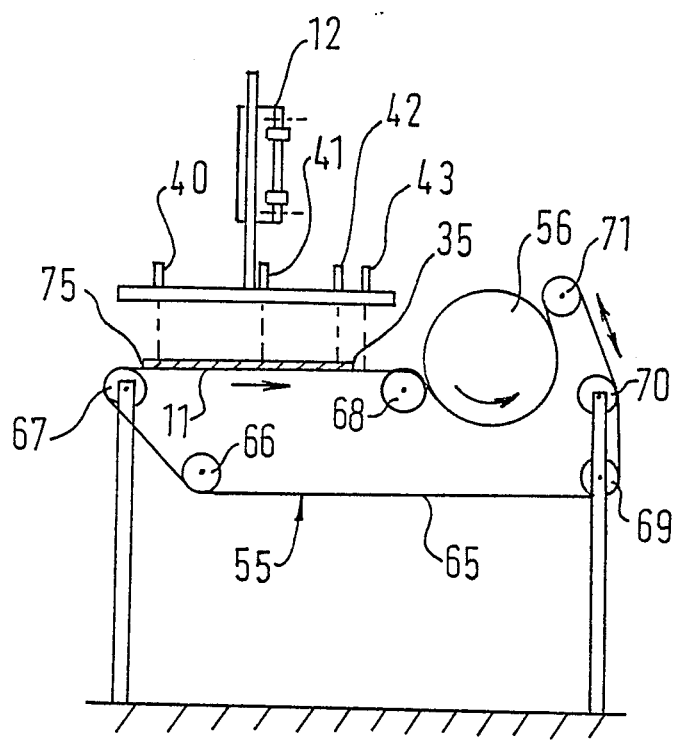
FIG. 12 is a side view of the apparatus shown in FIG. 11.

After the gripping device 12 has been disengaged from the ply 11, leaving it on the conveyor 55, the position of the ply is again checked by the photo-electric cells 40–43. The conveyor 55 comprises an endless belt 65 passing around fixed rollers 66,67,68,69,70 and a movable roller 71 which can tighten the belt in lapping relationship with the former 56 as shown in FIG. 12 and which can be lowered to release the belt from the former to enable the former to be withdrawn from the conveyor after a ply 11 has been transferred to it. Means is provided for driving the belt so that its upper run moves towards the former carrying the ply around the former so that it adheres to the surface of a rubber inner lining which has already been applied to the former 56 at a previous stage of the tire building process.

The photo-electric cells 43 and 40 are spaced apart at an accurately predetermined distance and are arranged to provide signals to a control system as the leading end 35 and the trailing end 75 of each ply 11 passes the photo-electric cells 43 and 40 respectively, the control system including a rotary encoder driven from the belt surface so that a measurement of the length of the ply 11 may be determined before the ply has been wrapped around the former 56. Means (not illustrated) is provided for controlling and adjusting the diameter of the former 56, which may be of the type incorporating radially movable segments under the control of a motor-driven expander mechanism so as to match the circumference of the former and any material carried thereon (i.e. a rubber liner) to the length of the particular ply which is being fed to it. By this means, it is possible to achieve a good joint between the ends of the ply when it has been fully transferred to the former.

The method and apparatus described above has the advantage that it enables sheets of parallel-cord ply material to be fed in an accurately predetermined location with one edge in accurate alignment with a predetermined circumferential line around the building former 56 as determined by the position of the adjustable stop 61.

Should the ply be of dimensions or shape which are outside the permitted tolerances, this can be detected by the photo-electric cells 40–43 and the ply can be rejected, for example by reversing the conveyor 55.

While in the specific example described above the invention is applied to the handling of ply fabric for pneumatic tire carcasses, it may also be used for handling other tire building components, or components for incorporation into other products of the rubber industry such as suspension bellows, or any other industrial application where sheet material is required to be fed in accurate relationship to a machine. The component may have a non-rectangular shape, such as a bias-cut ply and in this case one side edge is aligned as described above, and the leading edge may be positioned against a single abutment.

We claim:

1. A tire building server feeding a ply of tire building fabric to a tire building former and comprising:
- a table having a surface thereon on which said ply of the tire building fabric can be laid,
- means for tilting the table and means for supplying air to the surface of the table to enable the tire building fabric thereon to be aligned with one longitudinal edge of said fabric in alignment with a first abutment arranged on a first datum line,
- a gripping device for picking up said ply of tire building fabric in a flat condition, said gripping device being flat and of similar area to that of the table, and being arranged to be transversely movable and hold said ply of tire building fabric in an alignment preserving manner automatically to align said longitudinal edge with a second datum line substantially parallel with the first datum line so as to enable said ply of tire building fabric to be fed in appropriate alignment to a tire building former.

2. Apparatus according to claim 1 wherein the table is arranged to be tilted about a longitudinal axis to effect said alignment, and also about a transverse axis to enable a transverse end edge of the sheet of material to be aligned with an end abutment.

3. Apparatus according to claim 2 wherein the table is mounted on a sub-frame by means of a ball joint at one corner and by open socket hinge joints at the remaining three corners, lifting means being provided to engage the table at a lift point which is offset from the centre of the table so as to produce initially a tilt about a longitudinal axis through the ball joint and one of the hinge joints, an intermediate stop being provided to cause the axis of tilt of the table to be transferred, after tilting through a predetermined amount about the longitudinal axis, to a transverse axis through the ball joint and another of the open socket hinge joints.

4. Apparatus according to claim 3 wherein the intermediate stop comprises a stirrup attached to the table at its upper end and having a lower end engageable with a suitable abutment beneath the table.

5. Apparatus as claimed in claim 2 wherein the first abutment and end abutment are provided by spring loaded pegs.

6. Apparatus as claimed in claim 5 wherein the position of the second datum line is determined by adjustable stops allowing the relationship between the gripping device and the tire building former to be accurately determined.

7. Apparatus according to claim 1 wherein photoelectric cells are mounted on the gripping device to enable the position of the ply on the table and on the conveyor to be checked.

8. Apparatus according to claim 1 wherein means is provided for determining the length of a ply as the ply is fed to a tire building former, means being provided for adjusting the diameter of the former in accordance with the length of a ply being fed thereto so as to match the circumference of the former and any material carried thereon to the length of the ply.

9. A tire building server feeding a ply of tire building fabric to a tire building former and comprising:
- a table having a surface thereon on which said ply of tire building fabric can be laid;
- means for tilting the table and means for supplying air to the surface of the table to enable the tire building fabric thereon to be aligned with one longitudinal edge of said tire building fabric in alignment with a first abutment arranged on a first datum line;
- a gripping device for picking up said ply of tire building fabric in a flat condition, said gripping device comprising a flat shoe of similar area to that of the table, and being arranged to be transversely movable and hold said ply of tire building fabric in an alignment preserving manner automatically to align said longitudinal edge with a second datum line substantially parallel with the first datum line so as to enable said ply of tire building fabric to be fed in appropriate alignment to a tire building former on a conveyor, said flat shoe being a vacuum suction shoe mounted on an overhead track so that it may be moved to a predetermined position over the table to transfer said ply of tire building fabric to said table, and after alignment of said ply of tire building fabric on said table, to transfer said ply of tire building fabric to said conveyor.

* * * * *